(12) United States Patent
Kim

(10) Patent No.: US 8,885,351 B2
(45) Date of Patent: Nov. 11, 2014

(54) PORTABLE TERMINAL

(75) Inventor: Hyung-Gon Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 13/117,648

(22) Filed: May 27, 2011

(65) Prior Publication Data

US 2012/0106101 A1    May 3, 2012

(30) Foreign Application Priority Data

Nov. 1, 2010    (KR) .................. 10-2010-0107541

(51) Int. Cl.
| | |
|---|---|
| *H05K 5/00* | (2006.01) |
| *H04M 1/00* | (2006.01) |
| *H04M 1/02* | (2006.01) |
| *G06F 1/16* | (2006.01) |
| *H04M 1/23* | (2006.01) |

(52) U.S. Cl.
CPC .......... *H04M 1/0237* (2013.01); *G06F 1/1624* (2013.01); *H04M 1/00* (2013.01); *H04M 1/026* (2013.01); *H04M 2250/22* (2013.01); *H04M 1/233* (2013.01); *G06F 1/169* (2013.01)
USPC ... 361/752; 361/679.26; 361/807; 455/575.4; 455/550.1

(58) Field of Classification Search
CPC ... H04M 1/233; H04M 1/236; H04M 1/0249; H04M 1/0229; H05K 1/142; G06F 1/1616; G06F 1/169; G06F 3/03547; G06F 3/03548; G06F 3/03549

USPC ............. 361/752, 679.26, 807–810, 679.01; 455/550.1, 575.1–575.9; 345/158
See application file for complete search history.

(56) References Cited

U.S. PATENT DOCUMENTS

| | | | |
|---|---|---|---|
| 6,591,088 B1 * | 7/2003 | Watanabe .................... 455/90.3 |
| 7,440,783 B2 * | 10/2008 | Hyun ......................... 455/575.3 |
| 7,611,113 B2 * | 11/2009 | Lai ............................ 248/286.1 |
| 7,848,786 B2 * | 12/2010 | Liu et al. .................... 455/575.1 |
| 7,877,122 B2 * | 1/2011 | Yamamoto et al. ........ 455/575.3 |
| 8,046,032 B2 * | 10/2011 | Babella ...................... 455/575.1 |
| 8,086,290 B2 * | 12/2011 | Yoon et al. ................. 455/575.4 |
| 8,190,219 B2 * | 5/2012 | Park et al. .................. 455/575.4 |
| 2001/0034211 A1 * | 10/2001 | Kuroshima et al. ............ 455/90 |
| 2005/0057525 A1 * | 3/2005 | Sun ............................... 345/173 |
| 2005/0122669 A1 * | 6/2005 | Lee ............................... 361/679 |
| 2007/0082695 A1 * | 4/2007 | Yoon et al. .................. 455/550.1 |
| 2008/0081505 A1 * | 4/2008 | Ou et al. ........................ 439/374 |
| 2008/0125193 A1 * | 5/2008 | Choi et al. ................. 455/575.1 |
| 2008/0266775 A1 * | 10/2008 | Song ............................. 361/683 |
| 2008/0304215 A1 * | 12/2008 | Chiu ............................. 361/681 |
| 2009/0135555 A1 * | 5/2009 | Komine et al. .......... 361/679.26 |
| 2009/0267464 A1 * | 10/2009 | Zhou et al. ................. 312/223.1 |

(Continued)

*Primary Examiner* — Adrian S Wilson
*Assistant Examiner* — Abhishek Rathod

(57) ABSTRACT

A portable terminal is formed with reinforced structures for withstanding external impacts. The portable terminal includes a front case and an input device arranged on the front case. A first rear cover coupled to a rear side of the front case is formed from a metallic material. A second rear cover coupled to the rear side of the front case and the first rear cover is formed from a synthetic resin. And a fastening device anchors the second rear cover to the rear side of the front case. The input device is positioned on an outer surface of the front case, and the fastening device is anchored to a rear side of the input device.

19 Claims, 4 Drawing Sheets

(56) References Cited

U.S. PATENT DOCUMENTS

2010/0048249 A1* 2/2010 Furuta et al. ................ 455/566
2010/0259880 A1* 10/2010 Tatsukami ............... 361/679.09
2011/0059780 A1* 3/2011 Taguchi ..................... 455/575.1
2011/0176262 A1* 7/2011 Wu et al. .................. 361/679.01
2011/0195759 A1* 8/2011 Griffin et al. .............. 455/575.1
2012/0106092 A1* 5/2012 Chen ............................ 361/728

* cited by examiner

PORTABLE TERMINAL

CROSS-REFERENCE TO RELATED APPLICATION(S) AND CLAIM OF PRIORITY

The present application is related to and claims the priority under 35 U.S.C. §119(a) of an application entitled "Portable Terminal" filed in the Korean Industrial Property Office on Nov. 1, 2010 and assigned Serial No. 10-2010-0107541, the contents of which are hereby incorporated by reference.

TECHNICAL FIELD OF THE INVENTION

The present invention relates to a portable terminal and, more particularly, to a combined structure of members forming a housing of a portable terminal.

BACKGROUND OF THE INVENTION

In general, a "portable terminal" may refer to a device that allows a communication function, a schedule management function, a multimedia file reproducing function, a game function, an electronic diary function, and so forth, while a user is carrying the portable terminal, and a mobile communication terminal is an example of such a portable terminal. Such a mobile communication terminal is installed with various functions, ranging from a simple voice communication function to the above-mentioned schedule management, multimedia file reproducing, game functions, and such. Recently, it has become possible for such a mobile communication terminal to receive or transmit services, such as digital multimedia broadcasting and large information files, that are provided in real time.

Such a portable terminal has a case, within which various circuit devices are arranged, and a cover member assembled to an opened side of the case in such a manner that the case and the cover member form a housing. The case may be formed with openings on the opposite side of the opened side or on a lateral side, such that input/output devices, such as a keypad and a display module, can be exposed as desired.

In order to minimize interference phenomena caused by a metallic material in connection with the actions of various circuit devices including an antenna device, the housings of portable terminals have been typically formed from a synthetic resin material. Recently, however, those housings are sometimes fabricated from a metallic material. This is because, due to the development of electronic communication technologies, the normal operations of the antenna device and the circuit devices are not significantly affected by an interference phenomenon, even if such a phenomenon occurs between one or more circuit devices and a metallic housing.

However, because it is advantageous to fabricate housings from a synthetic resin in order to diversify the shapes and colors of portable terminals, housings are manufactured by using a synthetic resin material and a metallic material in combination.

In addition, for a sliding-type terminal, it is advantageous to use a metallic material so as to secure structural strength because a pair of housings are slidably coupled to each other. It is possible to fabricate a sliding module and housings of a portable terminal separately and then to assemble them. In such a situation, however, the thickness of the resultant terminal is increased. Therefore, efforts are being continuously made for reducing the thickness of terminals, specifically the housings of the terminals, by forming slidable coupling parts on the housings of a terminal, and fabricating the slidable coupling parts from a metallic material.

However, if housings are fabricated from a synthetic resin material and a metallic material in combination, there is a disadvantage in that the adjoining parts between the synthetic resin material and the metallic material are frail to external impacts. That is, if external impacts are applied to the housings, the impacts will be concentrated to the adjoining parts between the synthetic resin material and the metallic material, and thus the adjoining parts may be readily fractured.

SUMMARY OF THE INVENTION

To address the above-discussed deficiencies of the prior art, it is a primary object to provide a portable terminal, which is strengthened in structural stability during assembly.

Also, another aspect of the present invention provides a portable terminal with a robust structure which is reinforced in endurance and is not readily fractured by external impacts.

In accordance with an aspect of the present invention, there is provided a portable terminal including a front case and an input device arranged on the front case. A first rear cover coupled to a rear side of the front case is formed from a metallic material. A second rear cover is coupled to the rear side of the front case and the first rear cover is formed from a synthetic resin. And a fastening device anchors the second rear cover to the rear side of the front case. The input device is positioned on an outer surface of the front case, and the fastening device is anchored to a rear side of the input device.

The input device may be a touch sensing pad or an optical track pad.

The fastening device may include a fastening hole formed on the rear side of the input device and a screw extending through the second rear cover from the outer surface of the second rear cover and anchored to the fastening hole.

Also, the fastening device may include a pair of hooks extending from the inner surface of the second rear cover parallel to each other and a hook hole formed on the rear side of the input device. The distal ends of the hooks may be bent away from each other, and the hooks may be anchored to the hook hole, thereby anchoring the second rear cover to the front case.

The portable terminal may further include a pair of escape holes oppositely formed on the inner wall of the hook hole, wherein the hooks are inserted into the hook hole in such a manner that their bent ends pass through the escape recesses.

In addition, the hooks may be anchored to the inner surface of the input device by being rotated after the bent ends of the hooks are fully inserted into the hook hole.

The portable terminal may further include a display module, one end of which is provided with a flexible printed circuit board, wherein the fastening device extends through the flexible printed circuit board, and the fastening device is anchored to the input device.

In this situation, the fastening device may be a screw extending through the second rear cover and anchored to the input device or at least one hook extending from the second rear cover and anchored to the input device.

In addition, the portable terminal may further include a through-hole formed through the flexible printed circuit board, wherein the rear side of the input device is preferably arranged parallel to the through-hole when the input device is positioned on the front case.

Meanwhile, the second rear cover may be joined with the first rear cover through dual injection molding.

In addition, the portable terminal may further include a first housing provided with a keypad, wherein a second housing formed by assembling the first and second rear covers may be slidably coupled to one side of the first housing.

In this situation, it may be desirable for the first rear cover to be slidably coupled to the one side of the first housing.

The portable terminal may further include a third rear cover coupled to the rear side of the front case in combination with the first and second rear covers. The third rear cover may be formed from a synthetic resin material, wherein the second rear cover is preferably positioned at one end of the first rear cover, and the third rear cover may be preferably positioned at the other end of the first rear cover.

In addition, the portable terminal may further include slits formed between the first and second rear covers, and between the first and third rear covers, respectively, wherein the slits provide means for coupling the second housing to the first housing.

The portable terminal configured as described above has at least one housing, wherein the housing is formed from metallic material and a synthetic resin material, in combination, and the input device arranged on the housing is anchored to the synthetic resin part, whereby the portable terminal can be structurally stabilized. Therefore, it is possible to prevent the portable terminal from being fractured by impact, and to secure high endurance for the portable terminal. Moreover, in a sliding-type portable terminal that includes a housing which is preferably formed from a metallic material and a synthetic resin material, an input device and a part of the housing formed from the synthetic resin may be joined with each other, whereby there are advantages in miniaturizing the terminal as well as securing the structural stability.

In accordance with another aspect of the present invention, there is provided a portable terminal including a rear housing, a front housing, an input device, and a fastening device. The front housing includes a front case and a rear side that slidably mounts to the rear housing. The rear side includes a first rear cover formed from a metallic material and a second rear cover formed from a synthetic material. The second rear cover is coupled to an edge of the first rear cover and fastened to the front case. The input device is coupled to the front case. And the fastening device anchors the second rear cover to the front case.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. In the following description, a detailed description of known functions and configurations incorporated herein will be omitted when it may obscure the subject matter of the present invention.

Figure 1:
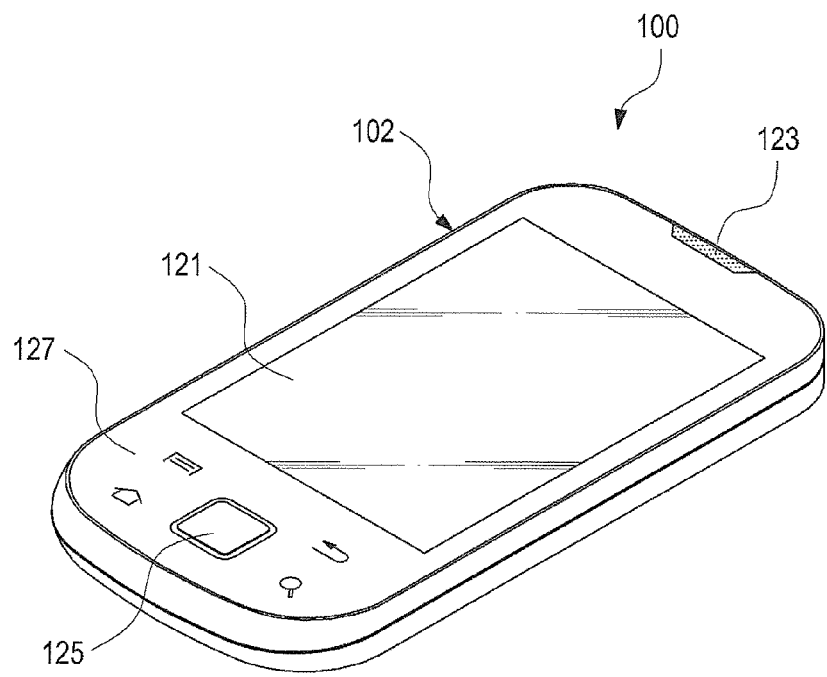
FIG. 1 is a perspective view of a portable terminal in accordance with an embodiment of the present invention.
Figure 2:
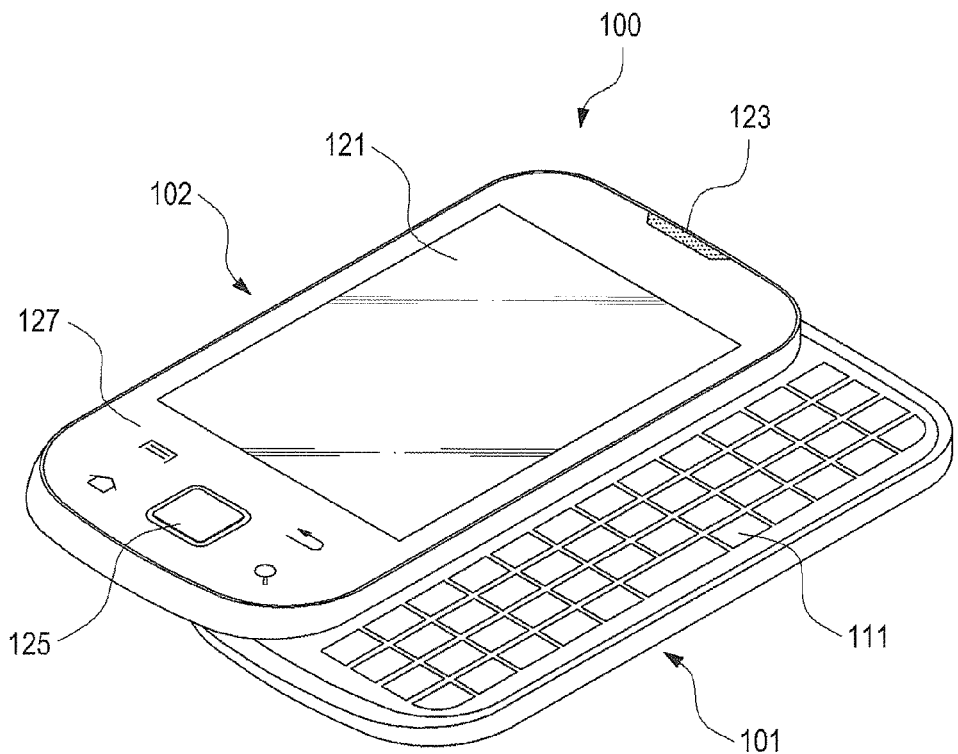
FIG. 2 is a perspective view of the portable terminal of FIG. 1 in a state in which the second housing of the portable terminal is slid to open the first housing according to an embodiment of the present invention.

As shown in FIGS. 1 and 2, a portable terminal 100, in accordance with an embodiment of the present invention, includes first and second housings 101 and 102 which are slidably coupled to each other, wherein as the second housing 102 is slid, a keypad 111 mounted on the first housing 101 is opened or closed (e.g. exposed or hidden).

The second housing 102 may be provided with a display device 121, wherein a receiver 123 is arranged above the display device 121, and another keypad 27 (hereinafter, referred to as "second keypad") that includes a call initiation/termination button, a menu access key, and such, is arranged below the display device 121. In such a case, the second keypad 127 may include a touch pad. Meanwhile, another input device 125 is positioned at the central area of the second keypad 127. The input device 125 may be used for moving a menu or scrolling a screen, wherein the input device 125 may be configured using a touch sensing pad or an optical track pad as well as a conventional 4-way key.

Figure 3:
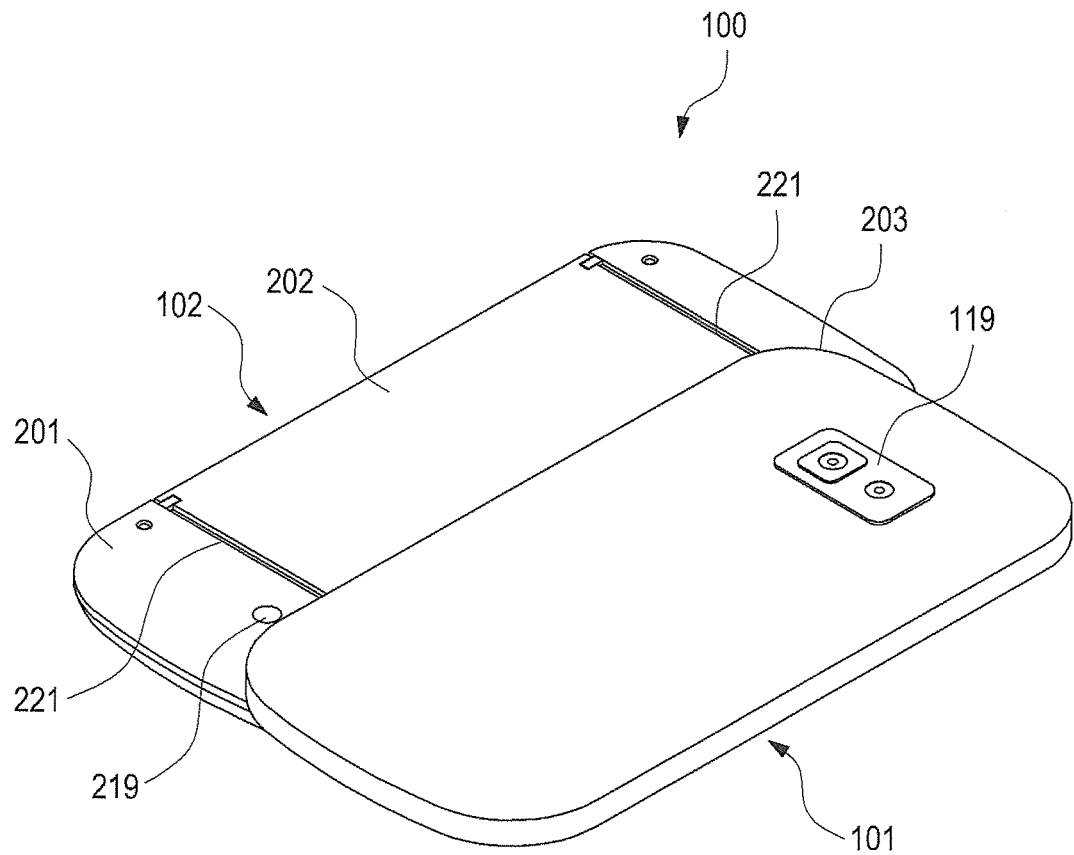
FIG. 3 is a perspective view of the rear side of the portable terminal shown in FIG. 2 according to an embodiment of the present invention.

FIG. 3 is a perspective view of the rear side of the portable terminal 100. Referring to FIG. 3, a camera lens 119 is installed on the rear side of the first housing 101, and a battery pack (not shown) is installed within the first housing 101. At least one pair of slits 221 are formed on the rear side of the second housing 102 so as to provide a means for slidably coupling the second housing 102 to the first housing 101.

In general, housings for portable terminals are fabricated through injection molding, which enables the colors of the housings to be implemented diversely and is suitable for mass-producing the housings in an identical shape. In addition, in connection with the slidable coupling of the first and second housings, the first and second housings may be fabricated using a metallic material so as to prevent the first and second housings 101 and 102 from being separated from each other or fractured when impacts are applied to them. Therefore, the first and second housings 101 and 102 of the inventive portable terminal 100 may be partially formed from a metallic material.

Figure 4:
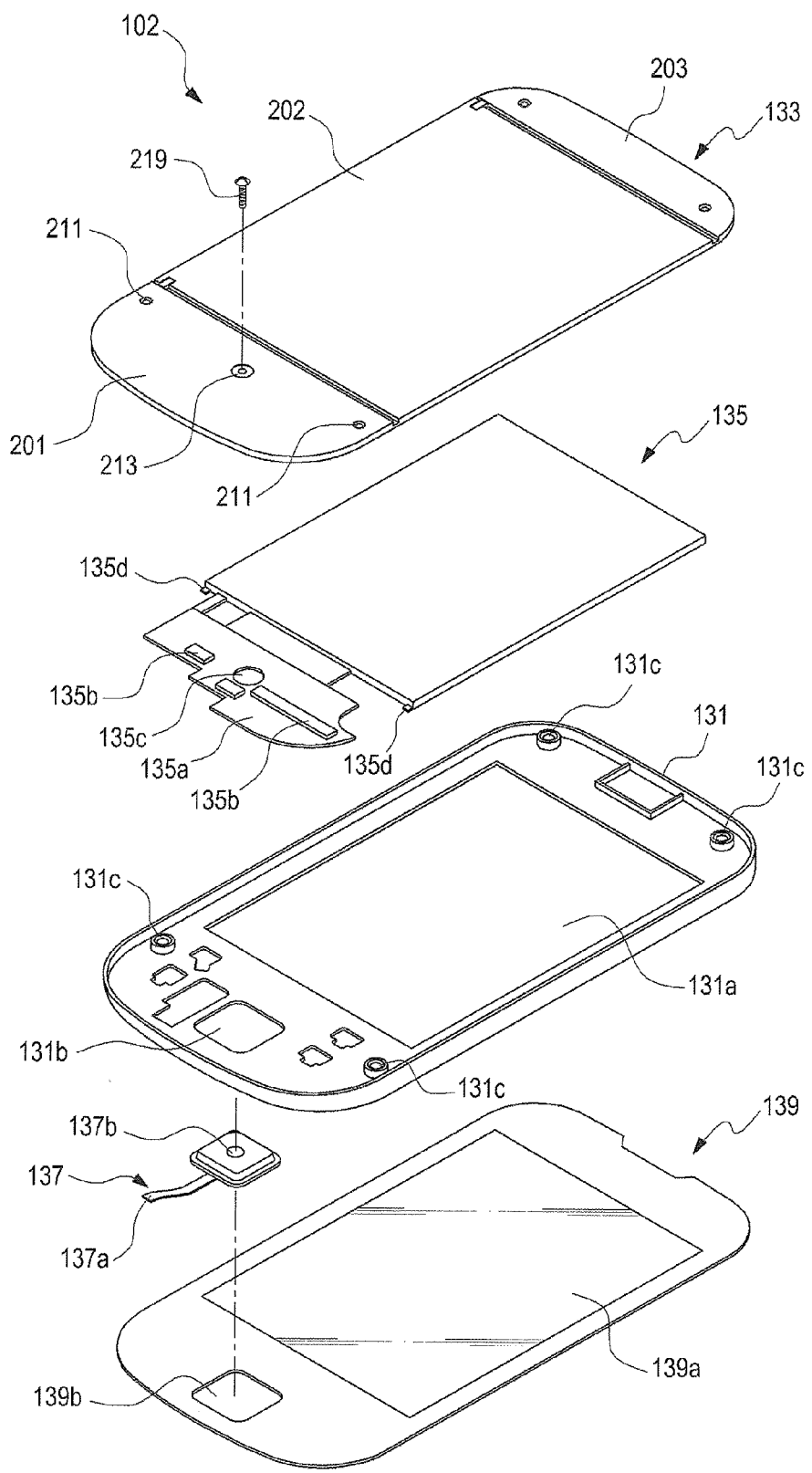
FIG. 4 is an exploded perspective view of the second housing of the portable terminal shown in FIG. 1 according to an embodiment of the present invention.

More specifically, a portion of the rear side of the second housing 102 may be formed from a metallic material and slidably coupled to the first housing 101, and the remaining portion of the rear side of the second housing 102 is formed from a synthetic resin material. In an embodiment, on the middle area of the rear side of the second housing 102, a first rear cover 202 formed from a metallic material is arranged, and second and third rear covers 201 and 203 formed from a synthetic resin material may be arranged at the opposite ends of the first rear cover 202, thereby completing a rear cover 133 (as illustrated in FIG. 4). Although it is possible to fabricate the entirety of the rear side of the second housing 102 with a metallic material, the present embodiment arranges the second and third rear covers 201 and 203 formed from a synthetic resin material at the opposite ends of the first rear cover 201 in consideration of the ability to assemble the slidable coupling structure, wherein the slits are positioned at the boundaries between the first rear cover 202 and the second and third rear covers 201 and 203.

Referring to FIG. 4, the second housing 102 is completed by assembling a front case 131 with the first, second, and third rear covers 202, 201, and 203, and a display module 135 and an input device module 137 are installed within the second housing 102. The input device module 137 will form the above-mentioned input device 125, wherein the input device module 137 may include at least one of a 4-way key module, a touch sensing pad module, and an optical track pad module. In addition, a separate window member 139 is preferably arranged on the outer surface of the front case 131 so as to prevent the display module 135 from being directly exposed to the outside.

The front case 131 may include a first opening 131a for exposing the screen of the display module 135, a second opening 131b for installing the input device module 137, and a plurality of bosses 131c are formed on the inner surface of the front case 131. The bosses 131c may provide anchoring means for screws for anchoring the first, second, and third rear covers 202, 201, and 203. Meanwhile, the window member 139 may include a third opening 139b for exposing a part of the input device module 137 and a transparent window 139a for making the screen of the display module visible to the outside. The perimeter of the transparent window 139a is attached to the front case 131 so as to shield the display module 135 from the outside.

The first, second, and third rear covers 202, 201, and 203 may be coupled to the rear side of the front case 131. As described above, the first rear cover 202 may be positioned at the middle area of the rear side of the second housing 102, and the second and third rear covers 201 and 203 may be arranged at the opposite end areas of the rear side of the second housing 102, respectively. The first rear cover 202 may be formed from a metallic material, and each of the second and third rear covers 201 and 203 may be formed from a synthetic resin material. The first, second, and third rear covers 202, 201, and 203 may be fabricated separately and assembled to the rear side of the front case 131. Alternatively, by utilizing dual injection-molding on the second and third rear covers 201 and 203 by arranging the first rear cover 202 within the metallic mold during the process of molding the second and third rear covers 201 and 203, it is possible to make the second and third rear covers 201 and 203 be joined to the opposite ends of the first rear cover 202, respectively, simultaneously with molding the second and third rear covers 201 and 203. Screw holes may be formed in the first to third rear covers 201, 202, and 203 so as to provide paths, to which the fastening device, such as screws are anchored, respectively, wherein the screw holes are positioned to correspond to the bosses 131c formed on the inner surface of the front case, respectively.

The display module 135 may include fixing ribs 135d formed on the longitudinal edges of the display module 135, and a flexible printed circuit board 135a extending from an end of the display module 135. The display module 135 may be arranged between the front case 131 and the first rear cover 202, wherein the fixing ribs 135d may provide means to be fixed to the inner surface of the front case 131. A plurality of connector sockets 135b may be arranged on the flexible printed circuit board 135a, so as to provide a means for connecting a second flexible printed circuit board (not shown) extending from the first housing 101 or a third flexible printed circuit board 137a extending from the input device module 137. In addition, a through-hole 135c maybe formed through the flexible printed circuit board 137a, wherein the through-hole 135c provides a path for a fastener for anchoring the second rear cover 201 to the input device module 137.

The input device module 137 may arranged on the outer surface of the front case 131 in such a manner that the edges of the rear side of the input device module 137 are supported by the edges of the second opening 131b. In addition, the window member 139 coupled to the front case 131 may support the edges of the front side of the input device module 137. As a result, the input device module 137 may be fixed by the front case 131 and the window member 139 at the edges of the front and rear sides thereof.

As described above, the input device module 137 may include a third flexible printed circuit board 137a extending from one edge of the input device module 137. The third flexible printed circuit board 137a may be connected to one of the connector sockets 135b provided on the flexible printed circuit board 135a. A fastening hole 137b may be formed on the rear side of the input device module 137 to provide a fastening device for anchoring the second rear cover 201 to the input device module 137.

If the input device module 137 is located in the front case 131, its rear side may be arranged to the through-hole 135c of the flexible printed circuit board 135a. At this time, the fastening hole 137b may be arranged to face the through-hole 135c, and the fastening device may extend through the through-hole 135c and be anchored to the fastening hole 137b.

Figure 7:
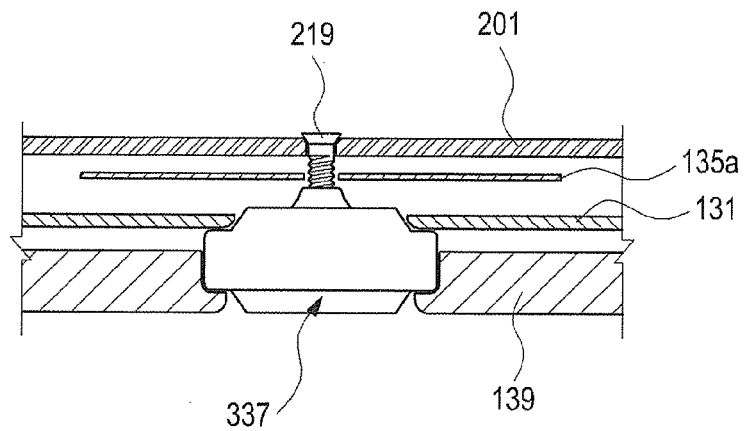
FIG. 7 is a cross-sectional view of the second housing shown in FIG. 4 according to an embodiment of the present invention.

As shown in FIGS. 4 and 7, a screw 219 may be used as the fastening device for anchoring the second rear cover 201 to the input device module 137. The screw 219 is anchored to the fastening hole 137b formed on the rear side of the input device module 137 in a state in which its head is abutted against the outer surface of the second rear cover 201. Consequently, the fastening device is anchored to the rear side of the input device module 137 on the rear side of the front case 131. As a result, the second rear cover 201 may be anchored to the front case 131 by the screws anchored through the screw holes 211 formed adjacent to the edges of the second rear cover 201, and may also be anchored to the input device module 137 through another screw hole 213 formed at the central part.

Figure 5:
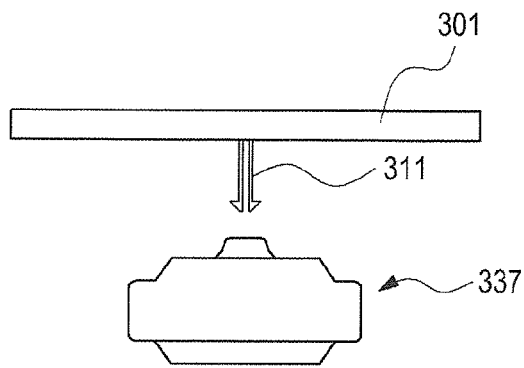
FIG. 5 is a side elevational view of a modified fastening device between the second rear cover and the input device shown in FIG. 4 according to an embodiment of the present invention.
Figure 6:
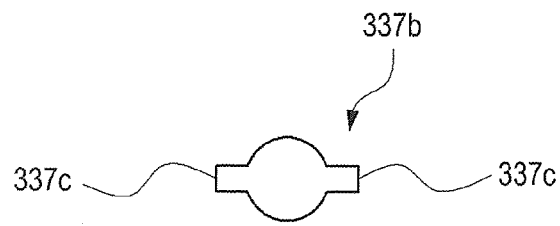
FIG. 6 is a top plan view of a hook hole formed in the input device shown in FIG. 5 according to an embodiment of the present invention.

Meanwhile, such a fastening device may be implemented by hooks 311, as shown in FIGS. 5 and 6. The parallel hooks 311 extend in pair from the inner surface of the second rear cover 301, and the ends of the hooks 311 are bent away from each other. In such a situation, a hook hole 337 is formed on the rear side of another input device module 337 (which has similar functions as input device module 137), wherein the hook hole 337b has a substantially circular shape may be located at the rear side of the input device module 137. While the hooks 311 are being inserted into the hook hole 337b, the bent (e.g. hooked) ends of the hooks 311 are pressed against the inner wall of the hook hole 337b, thereby being temporarily deformed (or bent). After the hooks 311 are completely inserted into the hook hole 337b, the hooks 311 are returned to their original shapes, whereby the bent ends are abutted against the inner surface of the input device module 137.

In an embodiment, the hook hole 337b may have a pair of escape recesses 337c formed oppositely on the inner wall of the hook hole 337b, and the hooks 311 may be inserted into the hook hole 337b as the bent ends pass through the escape recesses 337c, respectively. That is, the ends of the hooks 311 can be freely inserted into or extracted from the hook hole :337b through the escape recesses 337c. Therefore, it may be desired that after the hooks 311, more specifically the ends of the hooks 311, are completely inserted into the hook hole 337b, the hooks 311 are turned by a predetermined angle to be moved out of the escape recesses 337c, and anchored to the inner surface of the input device module 137.

As described above, because the second rear cover 201 or 301 is anchored to the input device module 137 through a separate fastening device, apart from being anchored to the first rear cover 202 as well as to the front case 131, external impacts can be distributed, and thus the possibility of its being fractured can be reduced.

In describing the specific embodiments of the present invention, it has been described as if the display device 121 and the display module 131, as well as the input device 125 and the input device module 137, are separate components, respectively. However, a person ordinarily skilled in the art will readily appreciate that the display device 121 may be formed by the display module 131, and the input device 125 may be formed by the input device module 137.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable terminal comprising:
a front case;
an input device arranged on an outer surface of the front case;
a first rear cover coupled to a rear side of the front case, the first rear cover formed from a metallic material;
a second rear cover coupled to the rear side of the front case and the first rear cover, the second rear cover formed from a synthetic resin;
a display module including a flexible printed circuit board at one end of the display module; and
a fastening device configured to be anchored to a rear side of the input device on the rear side of the front case so that the second rear cover is anchored to the rear side of the front case,
wherein the fastening device extends through the flexible printed circuit board, and the fastening device is anchored to the input device.

2. The portable terminal as claimed in claim 1, wherein the input device comprises a touch sensing pad.

3. The portable terminal as claimed in claim 1, wherein the input device comprises an optical track pad.

4. The portable terminal as claimed in claim 1, wherein the fastening device comprises:
a fastening hole formed on the rear side of the input device; and
a screw extending through the second rear cover and anchored to the fastening hole.

5. The portable terminal as claimed in claim 1, wherein the fastening device comprises:
a pair of hooks extending from an inner surface of the second rear cover, the pair of hooks parallel to each other, and distal ends of the hooks bent away from each other; and a hook hole formed on the rear side of the input device, the hooks configured to anchor to the hook hole, thereby anchoring the second rear cover to the front case.

6. The portable terminal as claimed in claim 5, the hook hole comprising a pair of escape recesses oppositely formed on the inner wall of the hook hole, the pair of escape recesses configured to allow the hooks to be inserted into the hook hole in such a manner that the distal ends pass through the escape recesses.

7. The portable terminal as claimed in claim 6, wherein the hook hole is configured to allow the hooks to be anchored to the inner surface of the input device by rotating the hooks after the distal ends of the hooks are fully inserted into the hook hole.

8. The portable terminal as claimed in claim 1, wherein the fastening device is one of a screw extending through the second rear cover and anchored to the input device, and at least one hook extending from the second rear cover and anchored to the input device.

9. The portable terminal as claimed in claim 1, the display module further comprising a through-hole formed through the flexible printed circuit board, wherein the rear side of the input device is arranged parallel to the through-hole when the input device is positioned on the front case.

10. The portable terminal as claimed in claim 1, wherein the second rear cover is joined with the first rear cover through dual injection molding.

11. The portable terminal as claimed in claim 1, further comprising a first housing comprising a keypad, wherein a second housing formed by assembling the first and second rear covers is slidably coupled to one side of the first housing.

12. The portable terminal as claimed in claim 11, wherein the first rear cover is slidably coupled to the one side of the first housing.

13. The portable terminal as claimed in claim 11, further comprising a third rear cover coupled to the rear side of the front case in combination with the first and second rear covers, the third rear cover formed from a synthetic resin material, wherein the second rear cover is positioned at one end of the first rear cover, and the third rear cover is positioned at an opposite end of the first rear cover.

14. The portable terminal as claimed in claim 13, further comprising:
a first slit formed between the first and second rear covers; and
a second slit formed between the first and third rear covers, wherein the first and second slits provide a means for slidably coupling the second housing to the first housing.

15. A portable terminal comprising:
a rear housing;
a front housing comprising a front case and a rear side configured to slidably mount to the rear housing, the front case having an opening that extends through the front case, the rear side comprising:

a first rear cover formed from a metallic material, and a second rear cover formed from a synthetic resin, the second rear cover coupled to an edge of the first rear cover and fastened to the front case;

an input device coupled to the front case, the input device having a projecting portion and a fastening hole formed on a surface of the projecting portion; and a fastening device extending into the fastening hole of the input device such that the fastening device is in contact with sides of the fastening hole, wherein the input device is positioned on an outer surface of the front case such that the projecting portion of the input device projects into the opening in the front case, and wherein when the fastening device extends into the fastening hole of the input device, the second rear cover is anchored to the front case.

16. The portable terminal of claim 15, wherein the second rear cover is joined with the first rear cover through dual injection molding to form a slit between the first and second rear covers.

17. The portable terminal of claim 15, wherein the fastening device comprises:

a screw extending through the second rear cover and anchored to the fastening hole.

18. The portable terminal of claim 15, wherein the fastening device comprises:

a pair of hooks extending from an inner surface of the second rear cover, the pair of hooks parallel to each other, and distal ends of the hooks bent away from each other, the hooks configured to anchor to the fastening hole, thereby anchoring the second rear cover to the front case.

19. The portable terminal of claim 18, the fastening hole comprising a pair of escape recesses oppositely formed on the inner wall of the fastening hole, the pair of escape recesses configured to allow the hooks to be inserted into the fastening hole in such a manner that the distal ends pass through the escape recesses.

* * * * *